US010532485B2

(12) United States Patent
McCracken

(10) Patent No.: US 10,532,485 B2
(45) Date of Patent: Jan. 14, 2020

(54) POSITIONING SYSTEM

(71) Applicant: The Limb Saw Company LLC, Norman, OK (US)

(72) Inventor: O. Wendell McCracken, Pauls Valley, OK (US)

(73) Assignee: The Limb Saw Company LLC, Norman, OK (US)

( * ) Notice: Subject to any disclaimer, the term of this patent is extended or adjusted under 35 U.S.C. 154(b) by 0 days.

(21) Appl. No.: 15/076,189

(22) Filed: Mar. 21, 2016

(65) Prior Publication Data

US 2017/0021522 A1   Jan. 26, 2017

Related U.S. Application Data

(60) Continuation-in-part of application No. 13/398,465, filed on Feb. 16, 2012, now Pat. No. 9,445,553, which is a division of application No. 11/827,485, filed on Jul. 11, 2007, now abandoned.

(60) Provisional application No. 62/291,825, filed on Feb. 5, 2016.

(51) Int. Cl.
| | | |
|---|---|---|
| *B60R 11/06* | (2006.01) | |
| *A01G 23/091* | (2006.01) | |
| *B27B 17/00* | (2006.01) | |
| *A01G 3/08* | (2006.01) | |

(52) U.S. Cl.
CPC .......... *B27B 17/0091* (2013.01); *A01G 3/086* (2013.01); *A01G 23/091* (2013.01); *B27B 17/0083* (2013.01); *B60R 11/06* (2013.01); *Y10T 403/32237* (2015.01)

(58) Field of Classification Search
CPC .... A01G 23/08; A01G 23/081; A01G 23/083; A01G 23/087; A01G 23/091; A01G 23/095; A01G 3/086; B60R 11/06; Y10T 403/32237; B27B 17/0091; B27B 17/0083
USPC ........................................................ 144/34.1
See application file for complete search history.

(56) References Cited

U.S. PATENT DOCUMENTS

| | | | | | |
|---|---|---|---|---|---|
| 2,828,610 | A | * | 4/1958 | Bruehl .................... | F15B 11/08 60/415 |
| 3,052,067 | A | * | 9/1962 | Dilks ....................... | B23Q 5/26 451/127 |
| 3,198,224 | A | * | 8/1965 | Hiley ...................... | A01G 23/067 144/24.12 |
| 3,307,643 | A | * | 3/1967 | Ferri ....................... | A01G 23/067 175/161 |
| 4,121,777 | A | * | 10/1978 | Kolstad .................. | A01G 3/002 144/24.12 |
| 5,501,257 | A | * | 3/1996 | Hickman .............. | A01G 23/091 144/335 |
| 5,709,254 | A | * | 1/1998 | Argue ................... | A01G 23/091 144/336 |
| 6,098,966 | A | * | 8/2000 | Latvis, Jr. ............... | F16F 9/54 267/221 |
| 6,968,877 | B1 | * | 11/2005 | Stokkeland .......... | A01G 23/091 144/34.1 |

* cited by examiner

*Primary Examiner* — Shelley M Self
*Assistant Examiner* — Smith Oberto Bapthelus
(74) *Attorney, Agent, or Firm* — Dunlap Codding, P.C.

(57) ABSTRACT

A positioning system, attachable to a vehicle for remote operation of the chain saw by a user sitting in the vehicle. A shock absorber indicator functions to tell the user when the weight on the limb is appropriate to engage the saw, and additionally cushions the drop when the saw cuts through the limb.

6 Claims, 16 Drawing Sheets

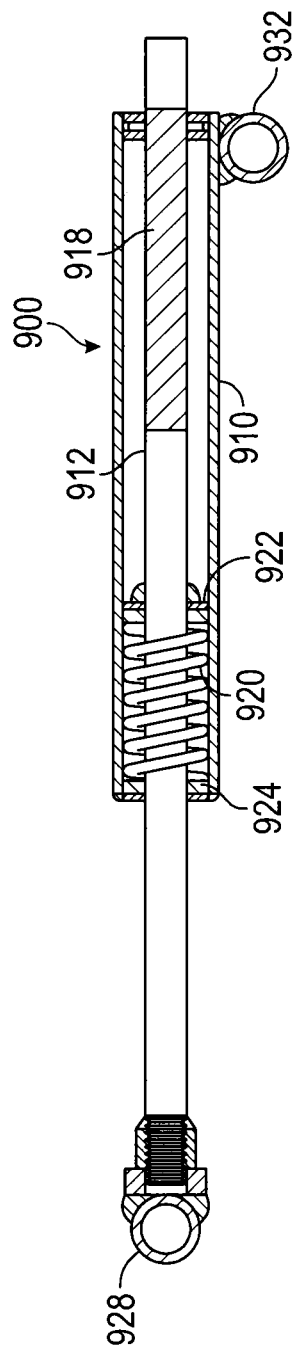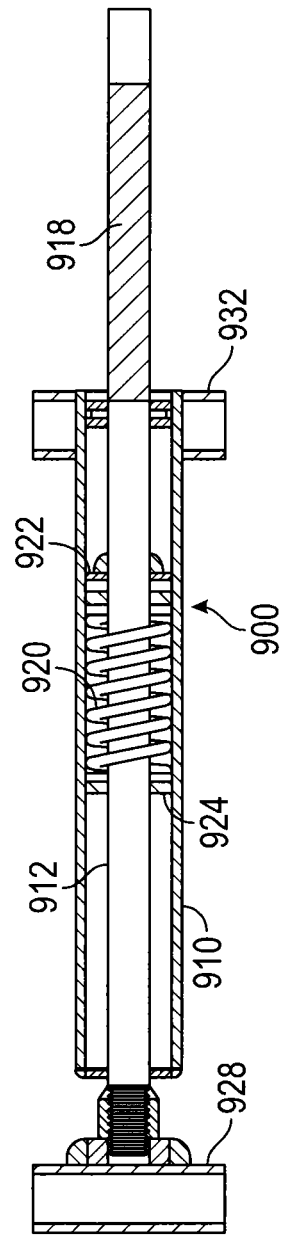
FIG. 3E
FIG. 3F

POSITIONING SYSTEM

CROSS REFERENCE TO RELATED APPLICATIONS/INCORPORATION BY REFERENCE STATEMENT

This application claims priority to provisional U.S. Application No. 62/291,825 filed Feb. 5, 2016. This application is also a continuation-in-part of U.S. application Ser. No. 13/398,465 filed Feb. 16, 2012 which is a divisional of U.S. application Ser. No. 11/827,485 filed Jul. 11, 2007, now abandoned. Each of the above-referenced patent applications is hereby expressly incorporated herein in its entirety.

BACKGROUND OF THE INVENTIVE CONCEPTS

1. Field of the Inventive Concepts

The inventive concepts disclosed and claimed herein relate to a positioning system, and more particularly, but not by way of limitation, to a positioning system attachable to a vehicle for remote operation of a saw at elevated positions by a user sitting in the vehicle.

2. Brief Description of Related Art

Tree limbs are typically removed by sawing, but many limbs are located higher than a person can reach standing on the ground. Those limbs that can be reached are typically directly overhead of the worker and pose significant danger when they fall. A lift or a tractor bucket can hold a worker aloft to use a hand-held saw to remove the target limb. But this procedure is also dangerous and usually requires two workers. Sometimes a worker uses a ladder or climbs the tree and pulls a chain saw up by a rope. However, the use of a power saw of any kind from a perch in a tree is fraught with dangers.

Improvements are needed to enable a person to safely cut large tree limbs that are unreachable from the ground or that are directly overhead of the person. It is to such improvements, systems, and methods of making and using the same that the inventive concepts disclosed herein are directed.

SUMMARY OF THE INVENTIVE CONCEPTS

The inventive concepts disclosed and claimed herein generally relate to a positioning system attachable to a vehicle for remote operation of a chain saw by a user sitting in the vehicle. The positioning system includes a mast attachable to a vehicle, an upper arm, and a shock absorber. The upper arm has a proximal end and a distal end. The proximal end is connected to a pivot bracket that is pivotally connected to an upper portion of the mast. The distal end of the upper arm is attached to a chain saw. The upper arm and the mast form an angle therebetween. The shock absorber includes a casing and a rod extendable therethrough. The shock absorber is pivotally connectable to the pivot bracket at an upper portion of the shock absorber, and is pivotally connectable to the mast at a lower portion of the shock absorber. The shock absorber, when connected, determines a minimum angle between the upper arm and the mast. The rod has an indicating portion that extends from the casing when the angle between the upper arm and the mast is greater than the minimum angle.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 3E is a top sectional view of an indicating shock absorber embodiment positioned as in FIG. 3A.

FIG. 3F is a top sectional view of an indicating shock absorber embodiment positioned as in FIG. 3B.

DETAILED DESCRIPTION OF THE INVENTION

Figure 1:
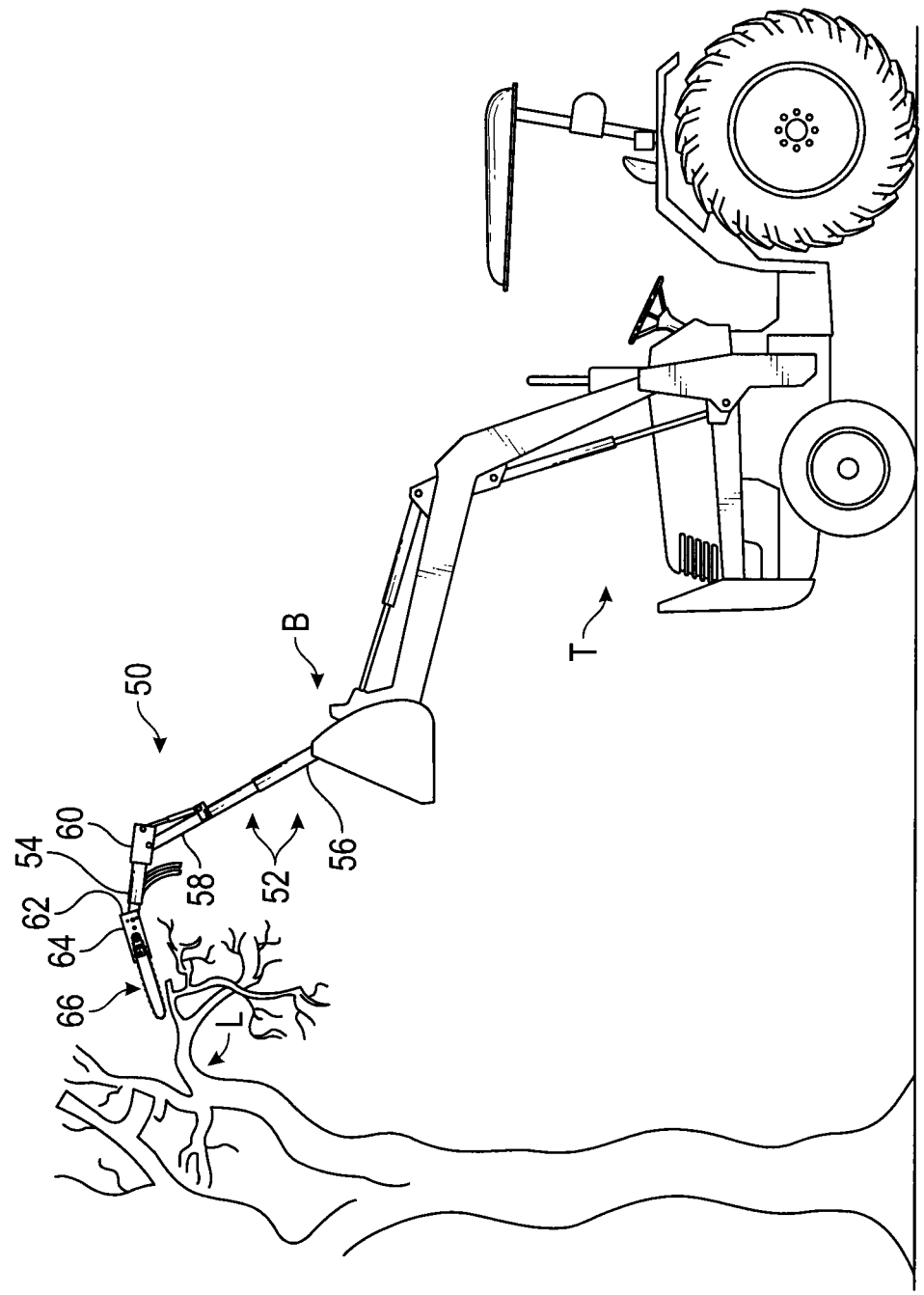
FIG. 1 shows the positioning system according to the present invention attached to a dirt bucket on a farm tractor wherein a hydraulically powered chain saw is attached to an upper arm.

Before explaining at least one embodiment of the presently disclosed inventive concept(s) in detail, it is to be understood that the presently disclosed inventive concept(s) is not limited in its application to the details of construction and the arrangement of the components or steps or methodologies set forth in the following description or illustrated in the drawings. The presently disclosed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed inventive concept(s) shall have the meanings that are commonly understood by those of ordinary skill in the art. Further, unless otherwise required by context, singular terms shall include pluralities and plural terms shall include the singular.

All of the articles and/or methods disclosed herein can be made and executed without undue experimentation in light of the present disclosure. While the articles and methods of the presently disclosed inventive concept(s) have been described in terms of preferred embodiments, it will be apparent to those of skill in the art that variations may be applied to the articles and/or methods and in the steps or in the sequence of steps of the method described herein without departing from the concept, spirit, and scope of the presently disclosed inventive concept(s). All such similar substitutes and modifications apparent to those skilled in the art are deemed to be within the spirit, scope, and concept of the presently disclosed inventive concept(s).

As utilized in accordance with the present disclosure, the following terms, unless otherwise indicated, shall be understood to have the following meanings:

The use of the word "a" or "an" when used in conjunction with the term "comprising" in the claims and/or the specification may mean "one", but it is also consistent with the meaning of "one or more," "at least one," and "one or more than one." The use of the term "or" in the claims is used to mean "and/or" unless explicitly indicated to refer to alternatives only or that the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

The term "associate" as used herein will be understood to refer to the direct or indirect connection of two or more items.

Turning now to the presently disclosed inventive concept(s), certain embodiments thereof are directed to a positioning system for elevated operation of a tree saw and other tools by a single operator who can remain in the seat of a vehicle such as a tractor, backhoe, skid loader, pickup, ATV, and the like.

Referring generally to the drawings and more particularly to FIG. 1, a positioning system 50 with an attached hydraulic chain saw includes a mast 52 attached to the dirt bucket B of a tractor T and an upper arm 54 supported by the mast 52. The mast 52 has a lower end portion 56 and an upper end portion 58. The upper arm has a proximate end 60 and a distal end 62. The proximate end 60 of the upper arm is pivotally attached to the upper end portion 58 of the mast 52. A mounting plate 64 attached to the distal end 62 of the upper arm 54 by bolts 63, 65 (See FIG. 2A) supports a chain saw assembly 66. Thus the tractor operator can position the tractor T beneath a tree and raise or lower the dirt bucket B of the tractor T to adjust the height of the chain saw assembly 66 with respect to a tree limb L selected for pruning or removal.

Figure 2A:
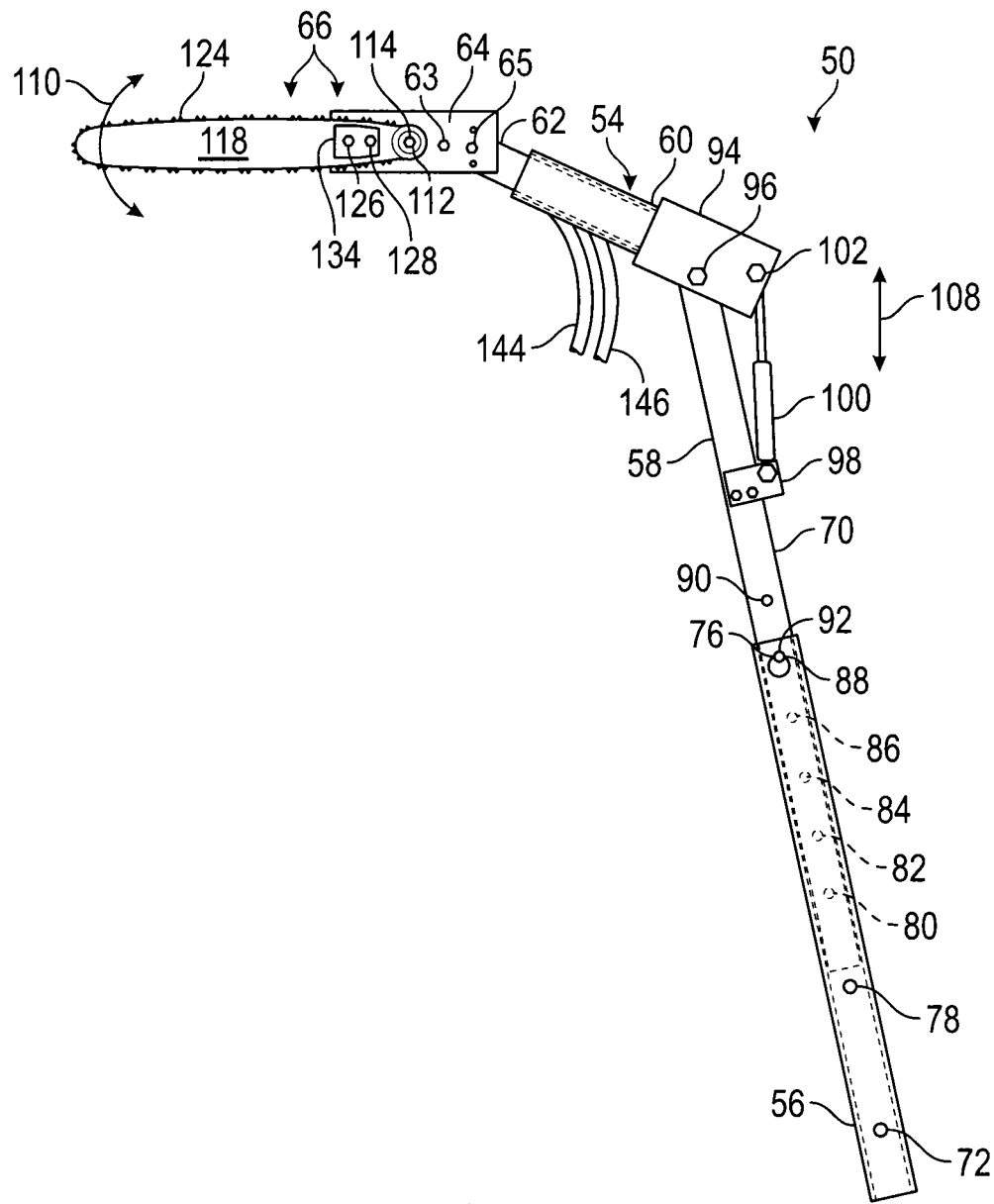
FIG. 2A is a view of the positioning system shown in FIG. 1 removed from the farm tractor.
Figure 2B:
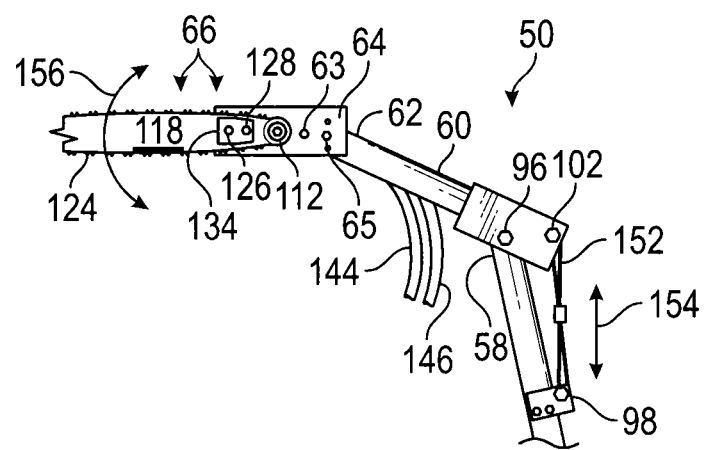
FIG. 2B shows another positioning system embodiment including a limit strap.
Figure 4:
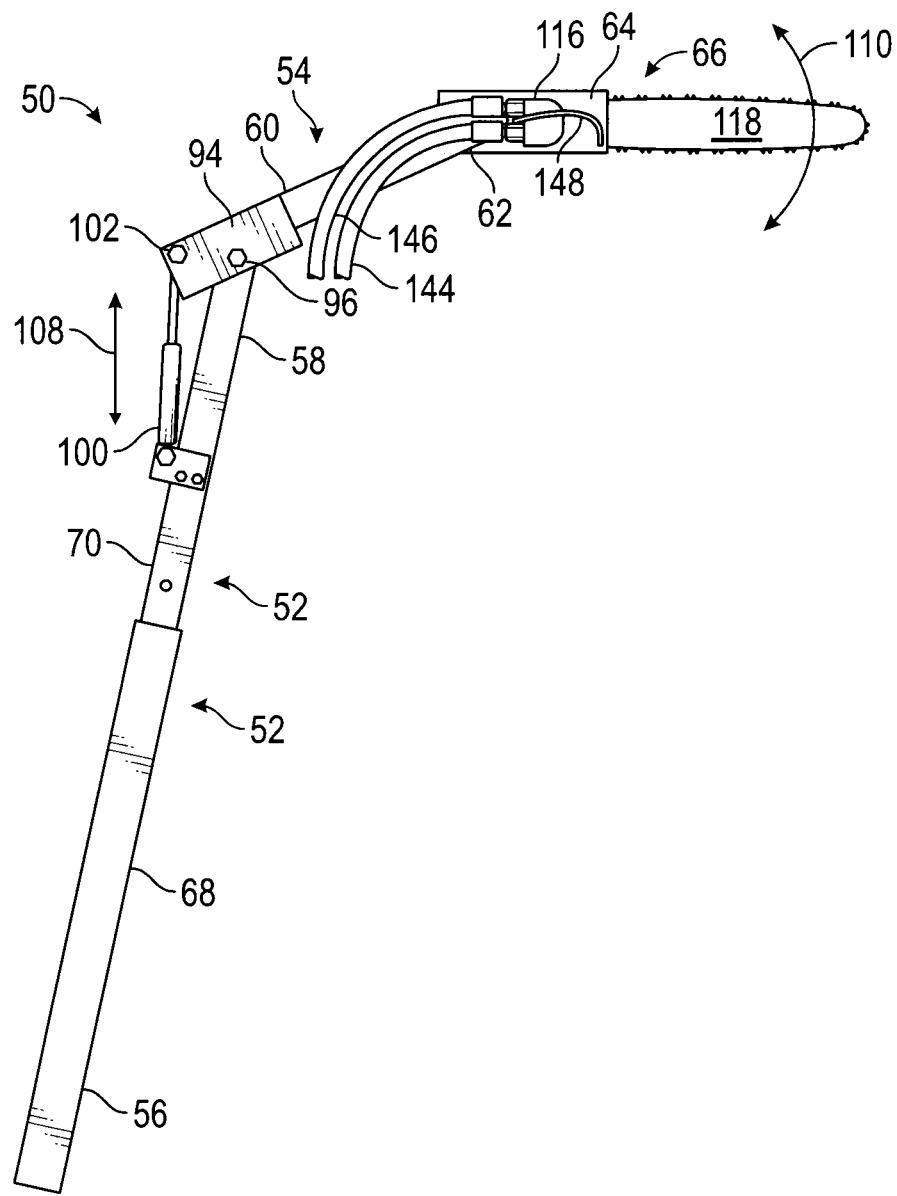
FIG. 4 is another view of the positioning system shown in FIG. 1.

Referring now to FIGS. 2A, 2B, and 4, in one embodiment the mast 52 is telescoping and consists of an outer mounting member 68 and a slidably extending inner member 70. The outer mounting member 68 has bores 72, 74 for attachment to the side of the dirt bucket B of the tractor T using suitable bolts (not shown). A locking pin bore 76 is aligned with a selected bore 88 of spaced bores 78, 80, 82, 86, 88, 90 in the slidably extending inner member 70. A locking pin 92 extends through the locking pin bore 76 in the outer mounting member 68 and the spaced bore 88 in the slidably extending inner member 70. Thus the telescoping mast 52 provides a second point of adjustment of the height of the chain saw assembly 66 above the tractor T, thereby increasing the elevation at which the chain saw assembly 66 can be used to prune or remove tree limbs.

Still referring to FIGS. 2 and 4, a pivot bracket 94 rigidly attached to the proximate end 60 of the upper arm 54 is pivotally attached to the upper end portion 58 of the mast 52 by a pivot bolt 96. A mounting bracket 98 attached to the slidably extending inner member 70 receives one end of a hydraulic cylinder 100. The other end of the hydraulic cylinder 100 is attached to a bolt 102 extending through the bracket 94. Hydraulic lines 104, 106 (See FIG. 5) provide control for the hydraulic cylinder 100, so the operator's extension/retraction of the hydraulic cylinder along arrow 108 causes movement of the chain saw assembly 66 along arrow 110.

Still referring to FIGS. 2 and 4, the mounting plate 64 attached to the distal end 62 of the upper arm 54 supports the chain saw assembly 66. A chain saw sprocket drive 112 driven by a shaft 114 from a hydraulic motor 116 (See FIG. 4) is aligned with a standard chain saw blade 118 (sometimes also referred to as the chain saw bar) having elongated slots 120, 122 (See FIGS. 10-11) for tension adjustment. A chain 124 engages the chain saw sprocket drive 112. The position of the chain saw blade 118 with respect to the sprocket drive 112 determines the tension on the chain 124. Bolts 126, 128 extending through bores 130, 132 in a chain saw blade locking plate 134, through the elongated slots 120, 122 in the chain saw blade 118, and through bores 136, 138 in the mounting plate 64 (See FIGS. 10-11) are secured by nuts 140, 142 (See FIGS. 10-11). Hydraulic lines 144, 146 connect the hydraulic motor 116 to a hydraulic power source (not shown) on the tractor T. An oil line 148 provides gravity feed of oil from an oil reservoir (See FIG. 6) to the chain 124.

Referring now to FIG. 2B, another positioning system 150 according to the present invention includes a limit strap 152 connecting the mounting bracket 98 and the bolt 102 in the pivot bracket 94. The limit strap 152 permits limited movement of the bolt 102 with respect to the mounting bracket 98 along arrow 154, thereby permitting the chain saw assembly 66 to move upwardly along arrow 156 in response to resistance from the targeted limb while preventing the chain saw assembly 66 from dropping downwardly along arrow 156 past a position wherein the chain saw assembly 66 cannot be used.

It will be understood by one skilled in the art that a chain saw works best when the weight of the chain saw provides most of the force for making the cut in the target limb L. It will be further understood by one skilled in the art that the chain saw assembly 66 shown in FIG. 2B relies on the weight of the chain saw assembly 66, whereas the hydraulic cylinder 108 shown in FIG. 2A permits the operator to apply a slight downward force to the chain saw assembly 66 during the cutting process.

Figure 3A:
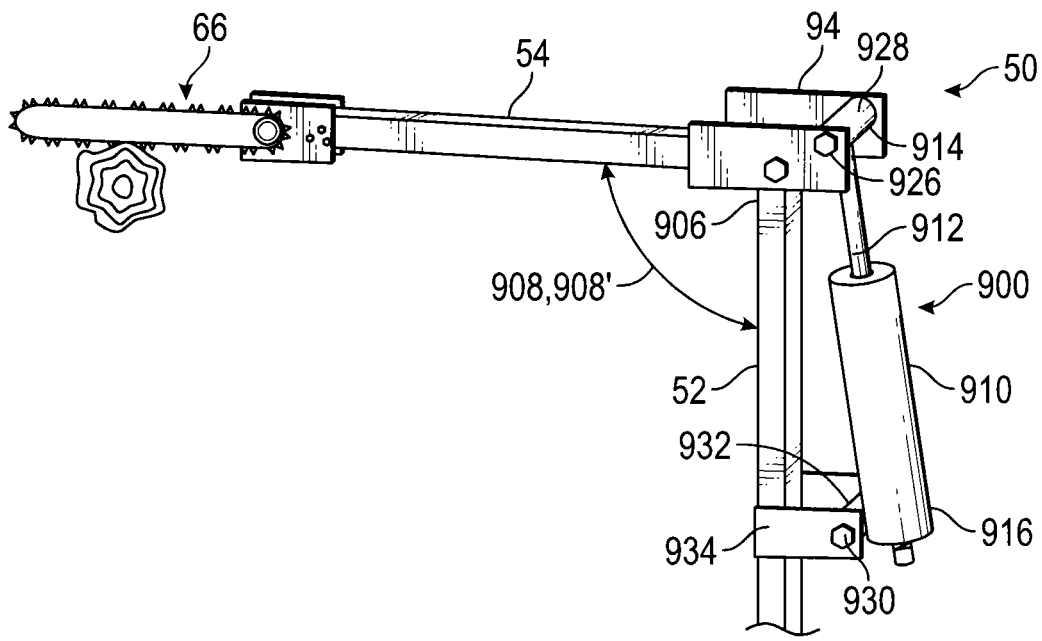
FIG. 3A shows another positioning system embodiment including an indicating shock absorber.
Figure 3B:
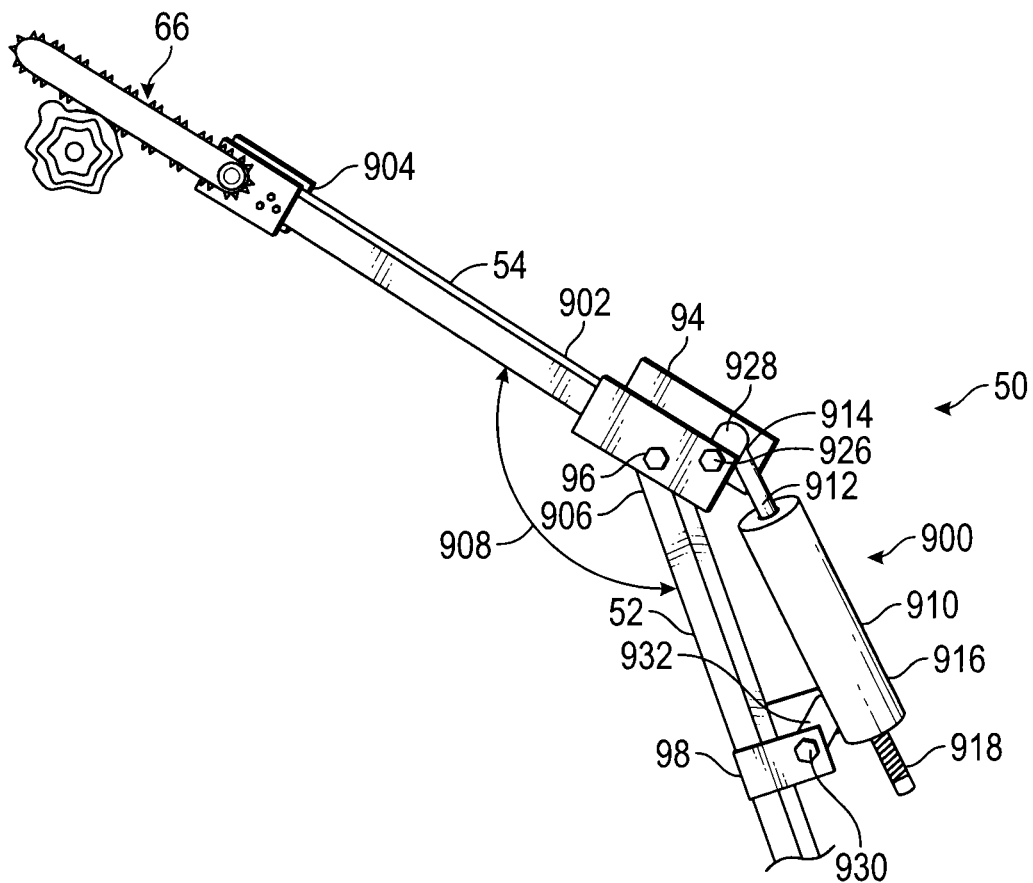
FIG. 3B shows the positioning system of FIG. 3A indicating it is time to engage the saw.

In one embodiment, as shown in FIG. 3A and FIG. 3B, the positioning system 50, attachable to a vehicle, for example a loader attachment on a tractor, for remote operation of the chain saw 66 by a user sitting in the vehicle, includes the mast 52, the upper arm 54, and a shock absorber 900. The upper arm 54 has a proximal end 902 connected to the pivot bracket 94, and a distal end 904 attached to the chain saw 66. The pivot bracket 94 is pivotally connected to an upper portion 906 of the mast 52. The upper arm 54 and the mast 52 form an angle 908 therebetween. The shock absorber 900 includes a casing 910 and a rod 912 extendable therethrough, the shock absorber 900 being pivotally connectable to the pivot bracket 94 at an upper portion 914 of the shock absorber 900, and pivotally connectable to the mast 52 at a lower portion 916 of the shock absorber 900. When connected, the shock absorber 900 determines a minimum angle 908' between the upper arm 54 and the mast 52. The rod 912 has an indicating portion 918 that extends from the casing 910 when the angle 908 between the upper arm 54 and the mast 52 is greater than the minimum angle 908'.

Figure 3C:
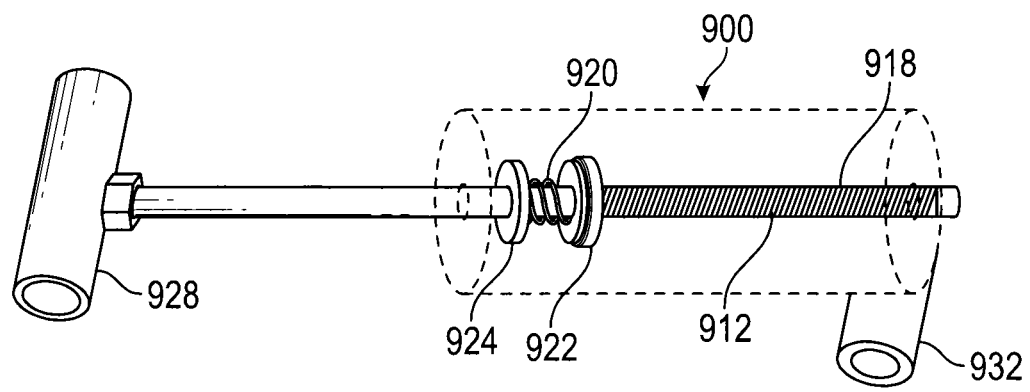
FIG. 3C shows the inner working of the indicating shock absorber embodiment positioned as in FIG. 3A.
Figure 3D:
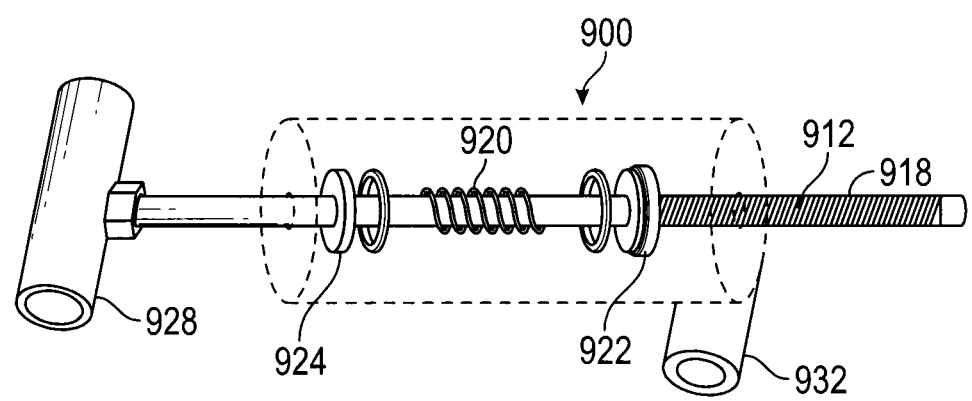
FIG. 3D shows the inner working of the indicating shock absorber embodiment positioned as in FIG. 3B.

In one embodiment shown in FIG. 3C and FIG. 3D, the shock absorber 900 includes a coil spring 920, a piston 922, and a rebound stop 924. Before the chain saw assembly 66 contacts the tree limb, as in FIG. 3A, the indicating portion 918 of the rod 912 is pulled into the casing 910 as shown in FIG. 3C by the weight of the chain saw assembly 66. Once the chain saw assembly 66 contacts the tree limb as in FIG. 3B, and the weight of the chain saw assembly 66 becomes at least partially supported by the tree limb, the rod indicating portion 918 is pulled outward from the casing 910 (see FIG. 3D). An appropriate length of the indicating portion 918 becoming visible to the operator lets the operator know that the required amount of weight is on the limb and it is time to engage the saw. The functioning of the indicating portion 918 can also be understood from FIG. 3E and FIG. 3F.

The rod indicating portion 918 can be made more visible to the operator by, for example, painting it a bright color that contrasts with the color of the positioning system 50. Any other suitable surface contrast can be utilized.

Once the operator has sawed through the limb, the chain saw assembly 66 drops to the minimum angle 908'. Potential wear and damage to the arm 54, pivot bracket 94 and mast 52 can be caused by this sudden drop. However, the drop is cushioned by the coil spring 920 compressing between the piston 922 and the rebound stop 924. This cushioning effect is also advantageous when driving the vehicle over rough spots with the upper arm 54 extended. Additional cushioning can be provided by, for example, use of O-rings on either side of the coil spring 920.

While a coil spring shock absorber is described herein, it is understood that other types of shock absorbers 900 can also be used. For example, hydraulic and air shock absorbers can be utilized.

When not in use, the indicating shock absorber can be disconnected from the pivot bracket 94 by removing a first pivot bolt 926 from an upper mount 928 of the shock absorber 900 and the pivot bracket 94, or by removing a second pivot bolt 930 from the lower mount 932 of the shock absorber 900 and a mast bracket 934, or both.

Figure 3G:
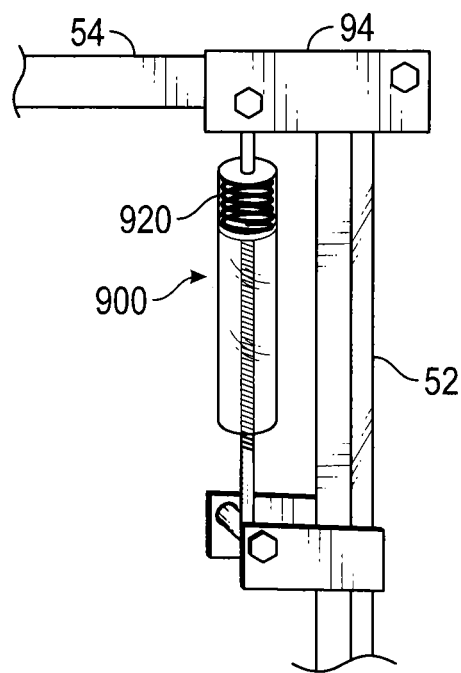
FIG. 3G shows a positioning system embodiment having an indicating shock absorber on the arm side of the mast.
Figure 3H:
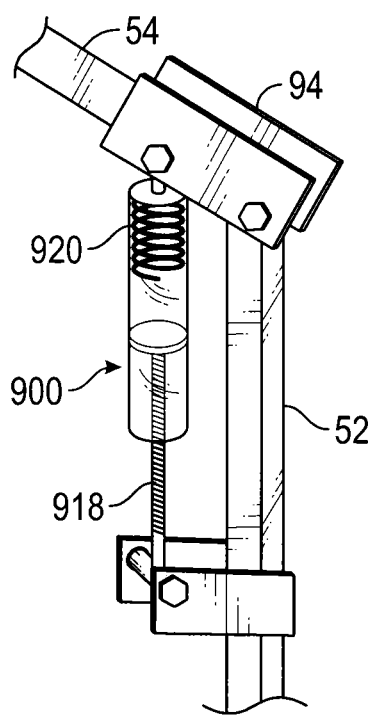
FIG. 3H shows the positioning system of FIG. 3G indicating it is time to engage the saw.

Other indicating shock absorber configurations can also be used. For example, FIG. 3G and FIG. 3H illustrate an indicating shock absorber 900 attached to the upper arm 54 and the mast 52 within the inside angle between the upper arm 54 and the mast 52.

Figure 5:
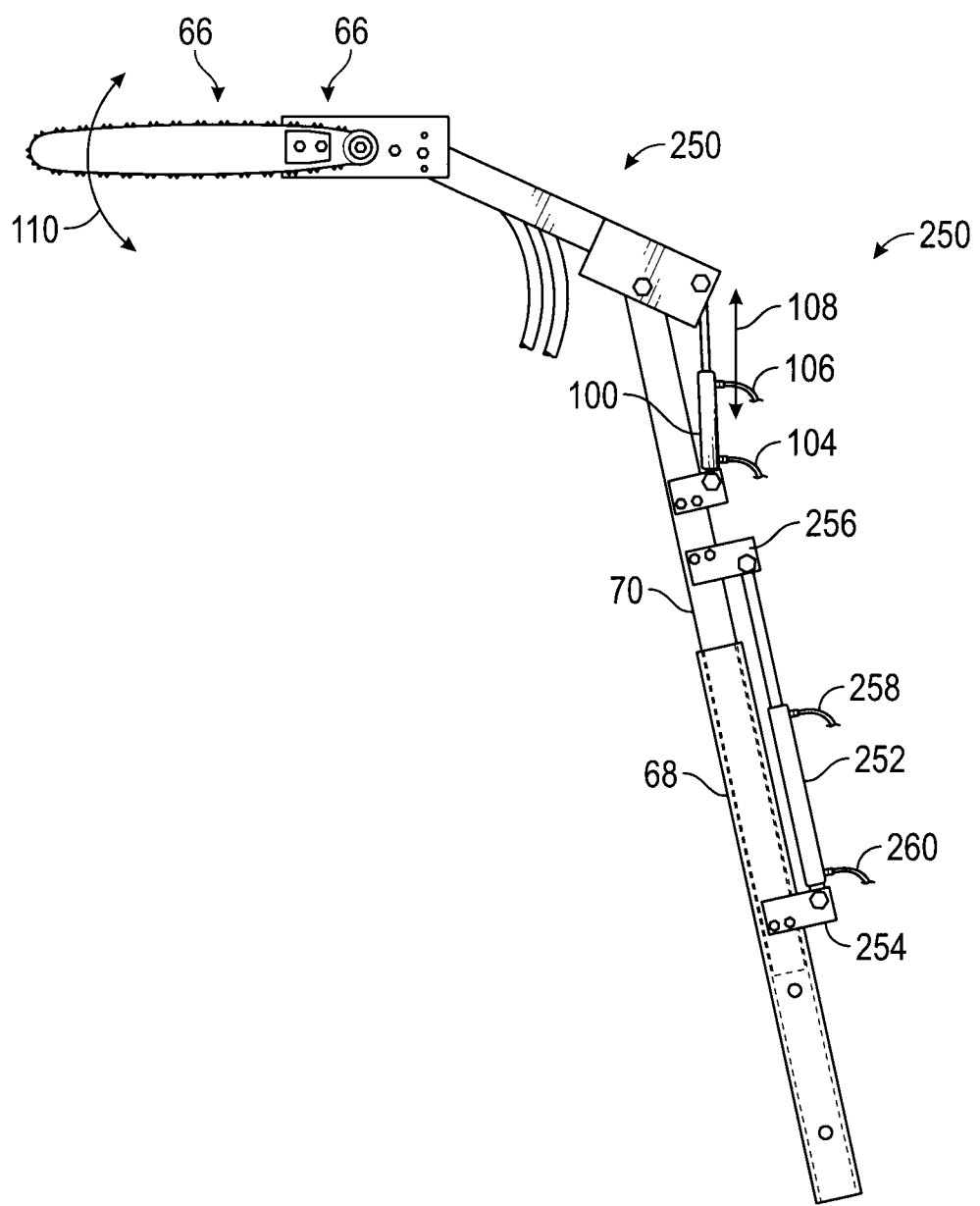
FIG. 5 shows another positioning system according to the present invention wherein the telescoping mast is power operated.

Referring now to FIG. 5, another positioning system 250 includes a telescoping mast hydraulic cylinder 252 attached at one end to a bracket 254 attached to the outer mounting member 68 of the telescoping mast 52 and at the other end to a bracket 256 attached to the slidably extending inner member 70 of the telescoping mast 52. Hydraulic lines 258, 260 connect the telescoping mast hydraulic cylinder 252 to a hydraulic power source (not shown) on the tractor T. The positioning system 250 shown in FIG. 5 permits hydraulic control of both the telescoping mast 52 by the telescoping mast hydraulic cylinder 252 and the saw blade assembly 66 by the hydraulic cylinder 100. It will be understood by one skilled in the art that the positioning system 252 shown in FIG. 5 is a modification of the positioning system 50 shown in FIGS. 1, 2, and 4, wherein the modification consists of the use of the telescoping mast hydraulic cylinder 252 to control the length of the telescoping mast 52 and eliminates the need for the locking pin 92.

Figure 6:
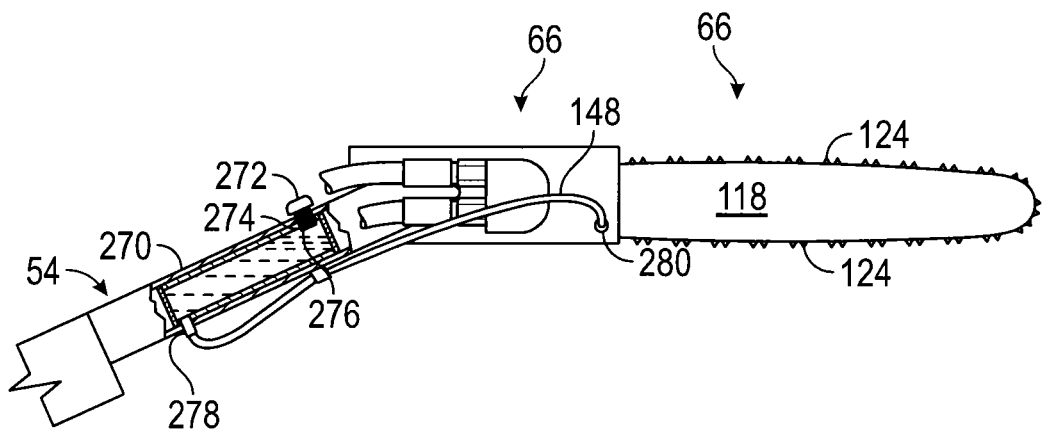
FIG. 6 is a view of the upper arm of the positioning system shown in FIGS. 1, 2, and 4 wherein a portion of the upper arm is cut away to show a chain oil (sometimes also called bar and blade oil) reservoir.

Referring now to FIG. 6, the upper arm 54 of the positioning system 50 houses a chain oil reservoir 270. A threaded vented cap 272 extends through a bore 274 in the upper arm 54 to engage a threaded bore 276 in the chain oil reservoir 270. A chain oil reservoir fitting 278 in the oil reservoir 270 permits chain oil to flow from the chain oil reservoir 270 through the chain oil line 148 to a mounting plate fitting 280 and through a spacer 282 containing chain oil transfer channels 284, 286, 288, and 290 (See FIG. 11).

Referring now to FIG. 6 in conjunction with FIGS. 1-5, the chain oil from the chain oil reservoir 270 is gravity fed through the oil line 148 to the mounting plate fitting 280 when the chain saw assembly 66 extends downwardly from the pivot plate 94 after cutting the target limb L (See especially FIG. 1). The bore 274 is sized so as to permit the threaded vented cap 272 to pass through the bore 274 with slight clearance. When the threaded vented cap 272 is threaded into the threaded bore 276 in the chain oil reservoir 270, the threaded vented cap 272 secures the chain oil reservoir 270 within the upper arm 54. Although square tubing is especially well suited for disposing a relatively smaller size within a relatively larger size to achieve a snug fit of the smaller square tubing within the larger square tubing, the upper arm 54 and the chain oil reservoir 270 can be of any suitable configuration.

Figure 7:
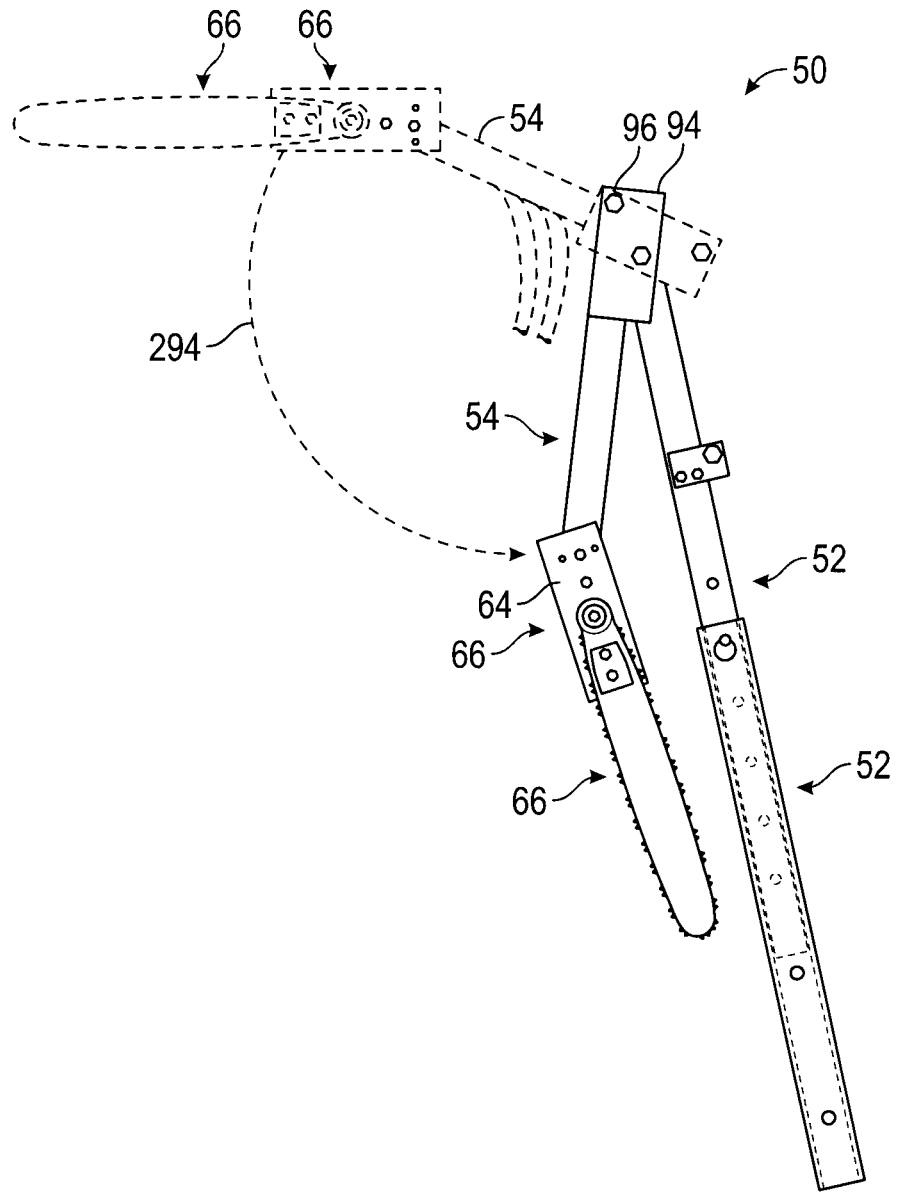
FIG. 7 is another view of the positioning system shown in FIGS. 1-6 wherein the upper arm is folded alongside the telescoping mast for storage and transport.

Referring now to FIG. 7, detachment of the hydraulic cylinder 100 of the positioning systems 50 and 250, or disconnection of one end of the limit strap 152 of the positioning system 150, permits the upper arm 54 to pivot on the pivot bolt 96 so the upper arm 54, the mounting plate 64, and the saw assembly 66 (or other tool attached to the mounting plate 64) can swing along an arc 294 between an extended use position, shown in phantom, and a folded storage position.

Figure 8:
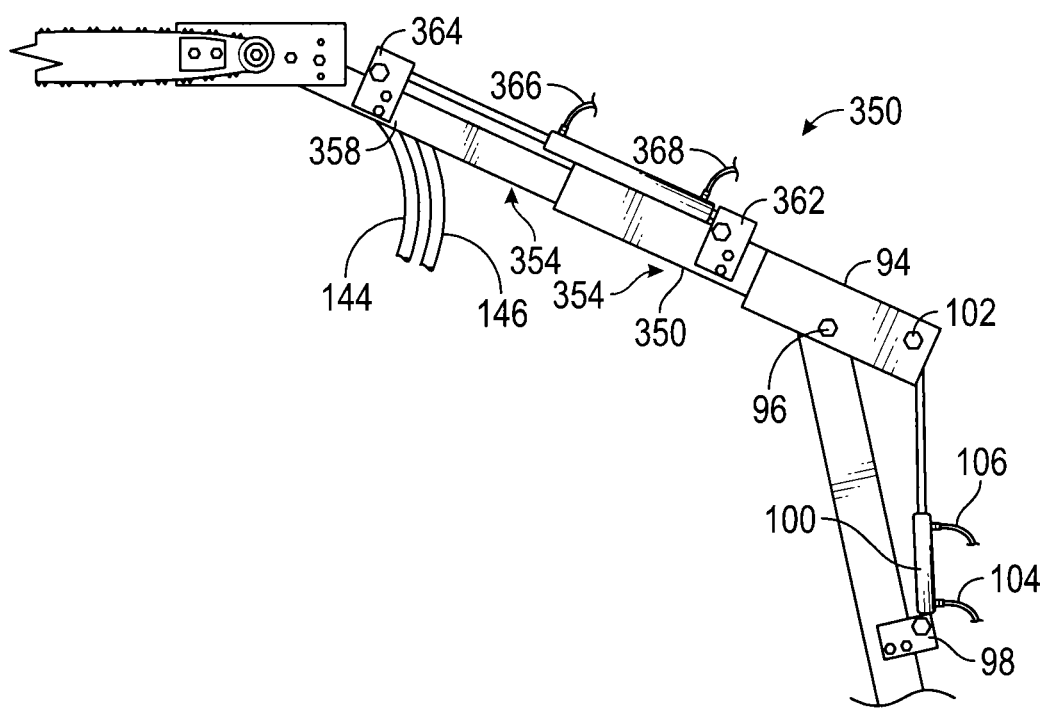
FIG. 8 is an enlarged detail of another positioning system according to applicant's invention.

Referring now to FIG. 8, another positioning system 350 has a telescoping upper arm 354 consisting of a telescoping upper arm outer member 356 and a slidably extending inner member 358 for locating the mounting plate 64 (and the saw assembly 66 attached thereto) at a convenient position distal from the pivot bracket 94. A telescoping upper arm hydraulic cylinder 360 is attached at one end to a bracket 362 on the outer member 356 of the telescoping upper arm 354 and at the other end to a bracket 364 on the slidably extending inner member 358 of the telescoping upper arm 354. Hydraulic lines 366, 368 connect the telescoping upper arm 354 hydraulic cylinder 360 to a hydraulic power source (not shown) on the tractor T.

Figure 9:
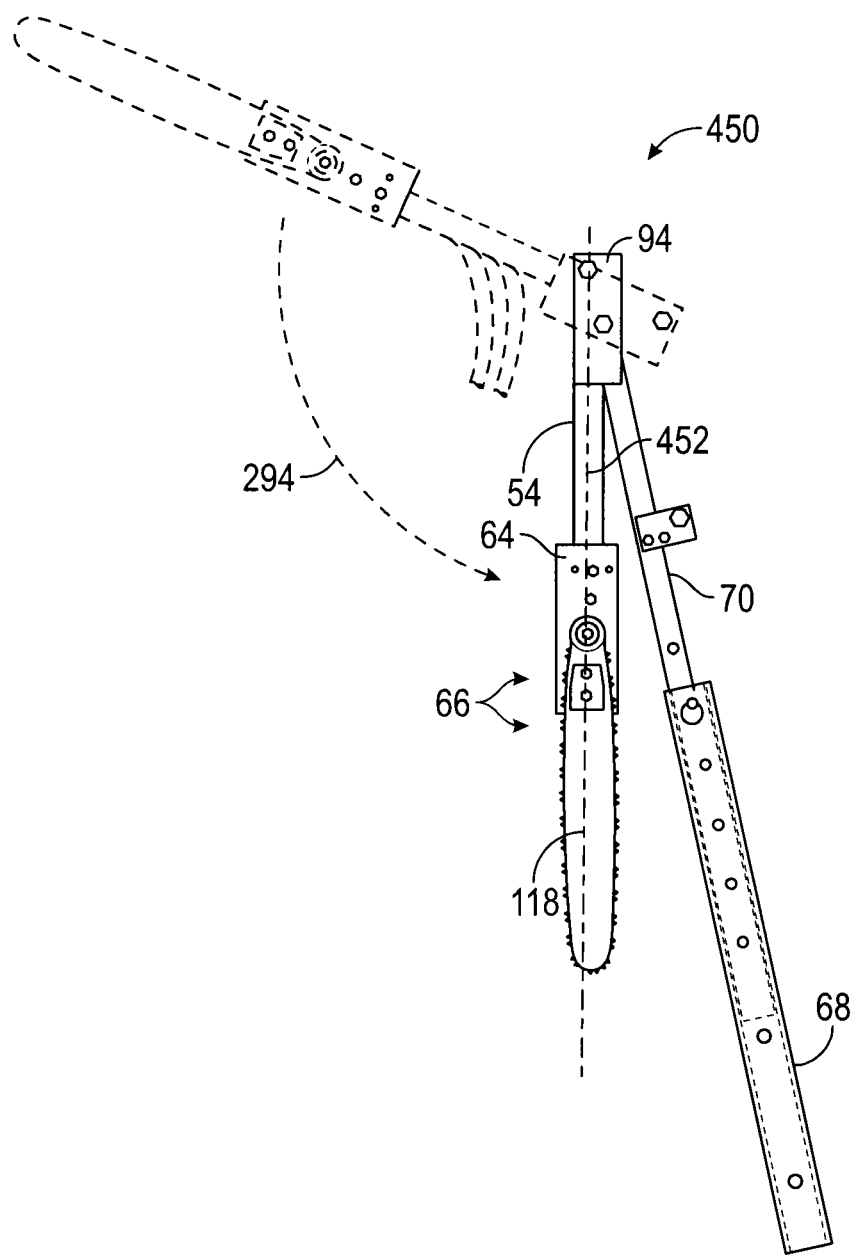
FIG. 9 is a view of another positioning system according to the present invention wherein the chain saw blade is generally aligned with the upper arm.

Referring now to FIG. 9, another positioning system 450 is similar to the positioning system 50 shown in FIG. 7 except for the longitudinal alignment of the pivot bracket 94, upper arm 54, the mounting plate 64, and the saw blade 118 along a common center line 452. The alignment along the common center line 452 permits a more compact arrangement when the saw assembly 66, the mounting plate 64, and the upper arm 54 are folded along 294 for storage.

Figure 10:
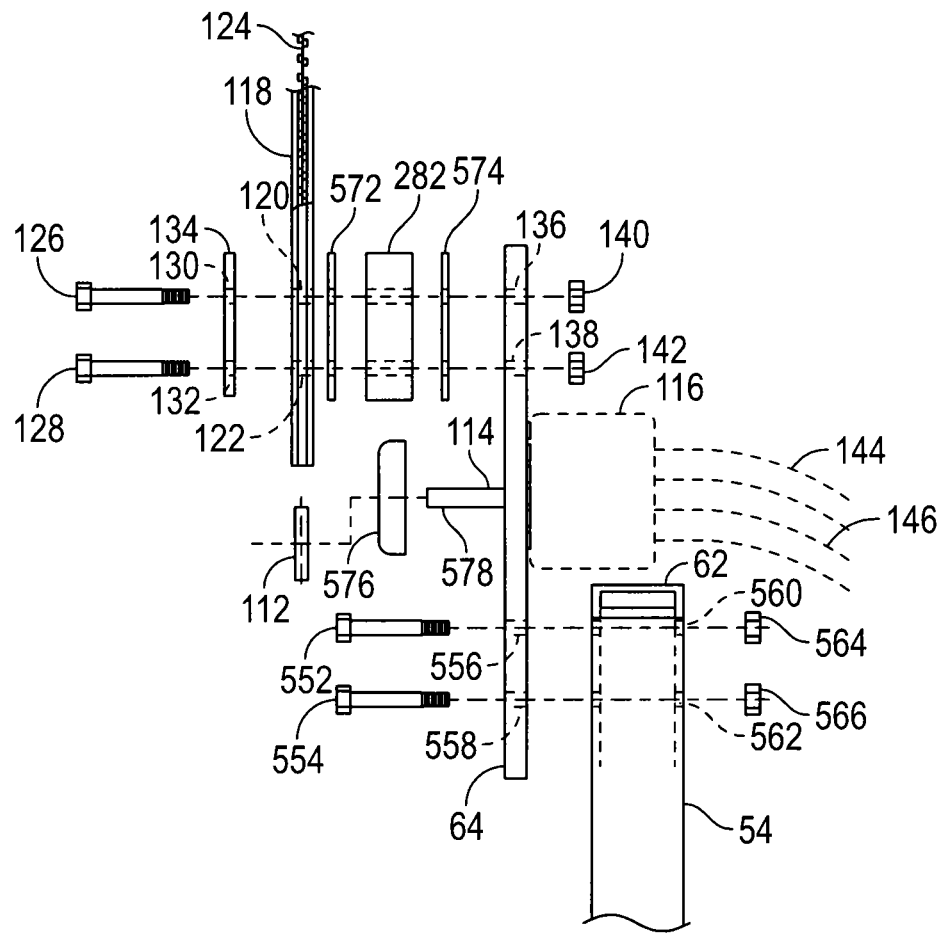
FIG. 10 is an exploded view showing the hydraulically powered chain saw assembly shown in FIGS. 1-9.
Figure 11:
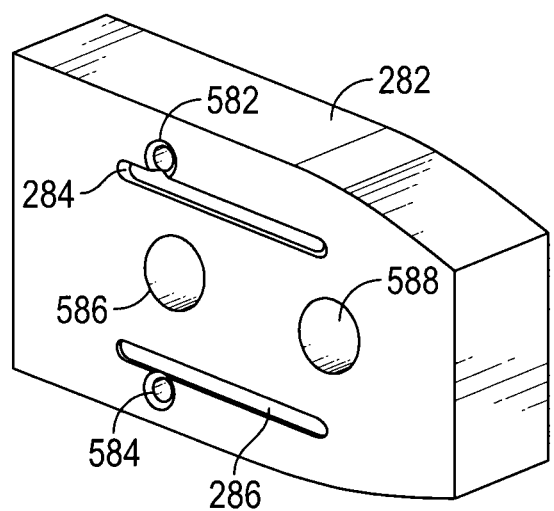
FIG. 11 is an enlarged view of a spacer block with oiling grooves.

Referring now to FIGS. 10 and 11, the mounting plate 64 is attached near the distal end 62 of the upper arm 54 by bolts 552, 554 disposed through bores 556, 558, respectively in the mounting plate 64, through bores 560, 562, respectively near the distal end of the upper arm 54, and secured by nuts 564, 566, respectively. The mounting plate 64 attached to the distal end 62 of the upper arm 54 supports the chain saw assembly 66. The chain saw sprocket drive 112 driven by the shaft 114 from the hydraulic motor 116 is aligned with the chain saw blade 118 having elongated slots 120, 122 for tension adjustment. The chain 124 engages the chain saw sprocket drive 112. The position of the chain saw blade 118 with respect to the sprocket drive 112 determines the tension on the chain 124. Bolts 126, 128 extending through bores 130, 132 in the chain saw blade locking plate 134, through the elongated slots 120, 122 in the chain saw blade 118, and through bores 136, 138 in the mounting plate 64 are secured by nuts 140, 142. Hydraulic lines 144, 146 connect the hydraulic motor 116 to a hydraulic power source (not shown) on the tractor T. An oil line 148 provides gravity feed of oil from an oil reservoir (See FIG. 6) to the chain 124.

Still referring to FIGS. 10 and 11, the spacer 282 is held between the saw blade 118 and the mounting plate 64 by bolts 126, 128 secured in place by nuts 140 and 142, respectively. An adapter 576 is keyed inwardly to the shaft 114 and outwardly to the drive sprocket 112. The drive sprocket 112 and the adapter 576 are secured to the keyed end 578 of the shaft 114 by a set screw (not shown). It will be understood by one skilled in the art that the drive sprocket 112 and the adapter 576 may, optionally, be integrated in a single drive sprocket keyed inwardly to the shaft 114.

Referring now to FIG. 11, the spacer 282 includes oiling channels 284, 286 on one side and oiling channels 288, 290 (not shown) on the other side. The oiling channels permit chain oil to move from the mounting plate fitting 280 (See FIG. 4) to mating oiling channels in the saw blade 118. It will be understood by one skilled in the art that oiling channels are standard construction for chain saw blades and are well known in the art. Bores 582, 584 in the spacer 282 connect oiling channels on opposite sides of the spacer 282. Bores 586, 588 receive bolts 126, 128, respectively for attachment of the saw blade 118 to the mounting plate 64. It will be further understood by one skilled in the art that the thickness of the spacer 282 is a design choice dictated solely by the need to align the saw blade 118 with the drive sprocket 112.

Figure 12:
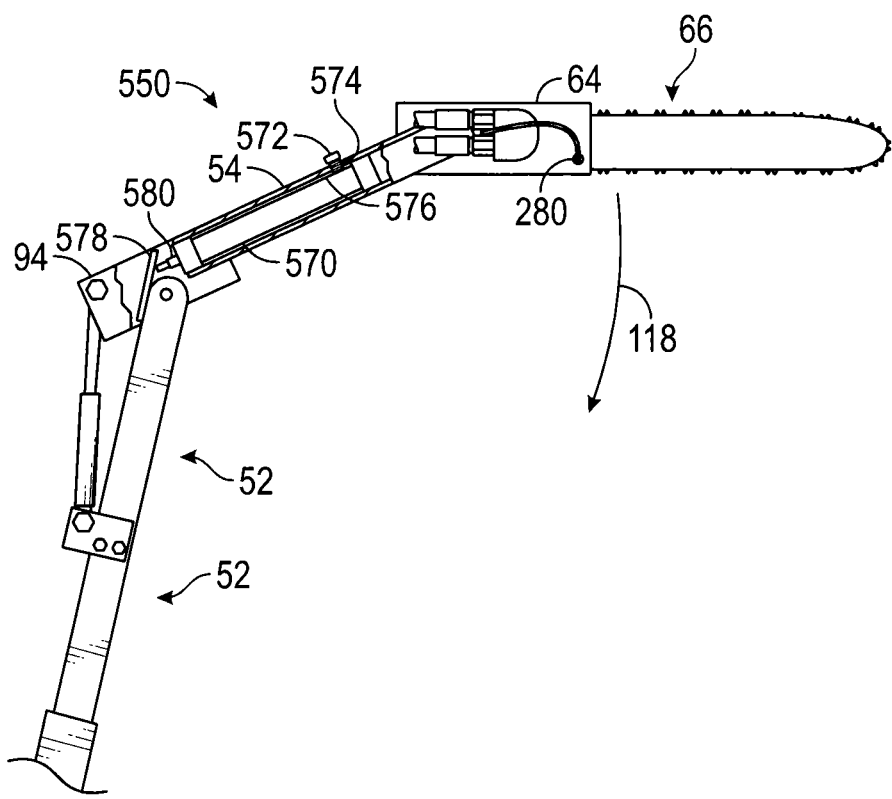
FIG. 12 shows another positioning system according to the present invention wherein the upper arm contains an automatic oiler for oiling the chain saw attached to the upper arm.

Referring now to FIGS. 12-15, another positioning system 550 according to applicant's invention includes a chain oil reservoir 570 within the upper arm 54. A threaded unvented cap 572 extends through a bore 574 in the upper arm 54 to engage a threaded bore 576 in the chain oil reservoir 570. As illustrated in FIG. 12, a pump assembly 580 (See FIG. 14) automatically pumps chain oil from the chain oil reservoir 570 to the chain 124 on the blade 118 each time the upper arm 54 and the chain saw assembly 66 mounted thereon are forced against a target limb L along arrow 118. An actuating member 578 attached to the upper end portion 58 of the mast 52 contacts a spring-biased open piston 582 in hydraulic communication with a cylinder 583. A suction check valve 584 connected the cylinder 583 to the chain oil reservoir 570 prevents chain oil from flowing from the cylinder 583 into the reservoir 570, while a discharge check valve 586 permits oil to flow through the oil line 148 to the mounting plate fitting 280 on the mounting plate 64 and then through the spacer 282 to oil the chain 124.

Figure 13:
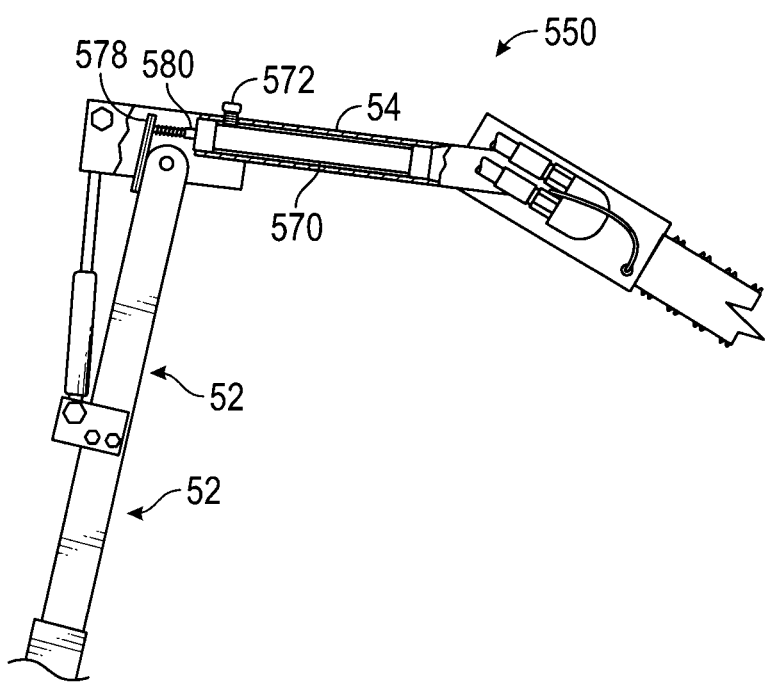
FIG. 13 is another view of the positioning system shown in FIG. 12.
Figure 14:
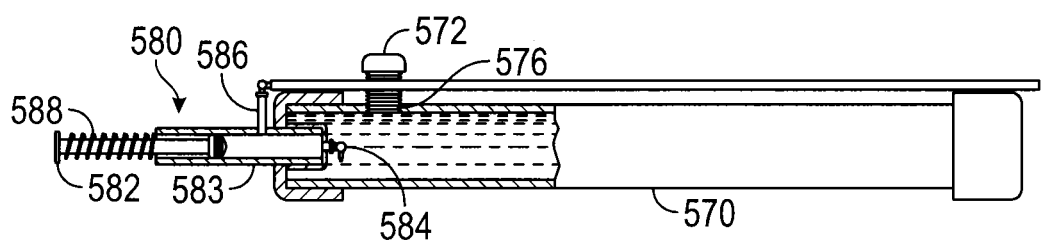
FIG. 14 is a detailed enlarged view of the automatic oiler shown in FIGS. 12-13.
Figure 15:
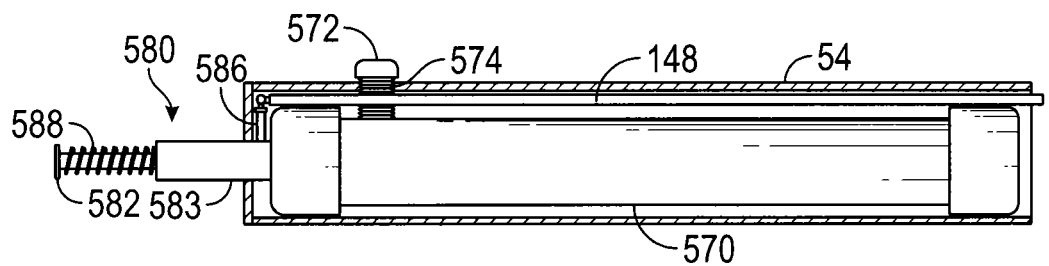
FIG. 15 is another view of the automatic oiler shown in FIGS. 12-14.

Still referring to FIGS. 12-15 and more particularly to FIG. 13, when the force on the actuating member 578 is relieved, a spring 588 effects a suction stroke. Chain oil is prevented from flowing backward through the discharge check valve 586 into the cylinder 583, so chain oil is drawn into the cylinder 583 through the suction check valve 584. When the upper arm 54 is once again moved downwardly along arrow 118 against a target limb L, the pump assembly 580 once again delivers oil to the chain.

Although the chain saw assembly 66 described herein is powered by a hydraulic motor, it will be understood by one skilled in the art that the chain saw assembly could also be powered by a pneumatic motor (requiring only a singly air line for power) or an electric motor (requiring an electric power line and a generator). Similarly, pneumatic positioners could be used in place of the hydraulic cylinders 100, 252.

Figure 16:
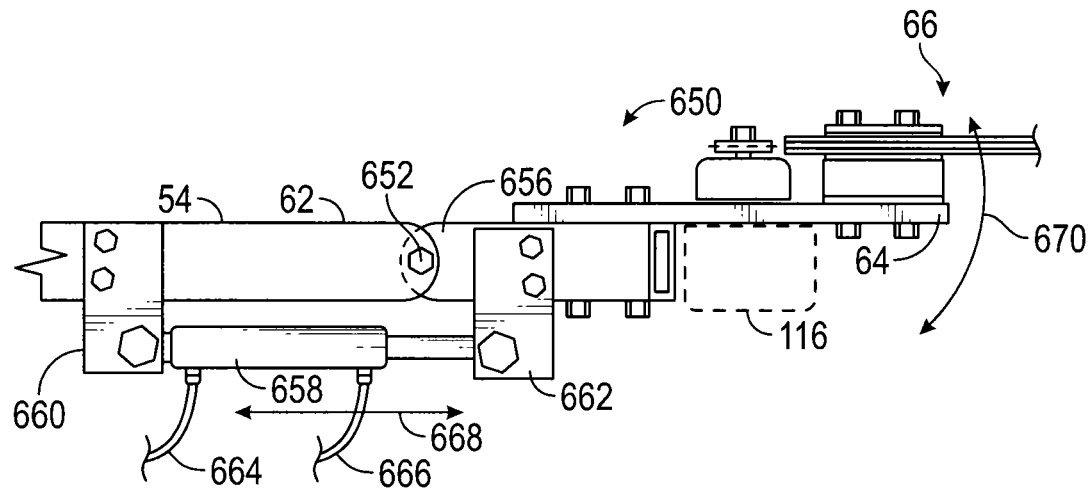
FIG. 16 shows another upper arm assembly according to the present invention wherein the hydraulically powered chain saw swings laterally from the end of the upper arm.

Referring now to FIG. 16, a top view of another positioning system 650 is shown with the mast 52, the pivot bracket 94, and the proximate end portion 60 of the upper arm 54 cut away. A vertical pivot bolt 652 disposed in vertical bores (not shown) near the distal end 62 of the upper arm 54 and through aligned vertical bores 654 (not shown) in mating horizontal tabs 656 secured to the mounting plate 64. A hydraulic cylinder 658 is attached on one end to a bracket 660 on the upper arm 54 and on the other end to a bracket 662 on one of the horizontal tabs 656. Hydraulic lines 664, 666 connect the hydraulic cylinder 658 to a hydraulic power source (not shown) on the tractor T. Operation of the hydraulic cylinder 658 along 668 causes the mounting plate 64 and the chain saw assembly 66 (or other tool attached to the mounting plate 64) to swing laterally along arrow 670.

Figure 17:
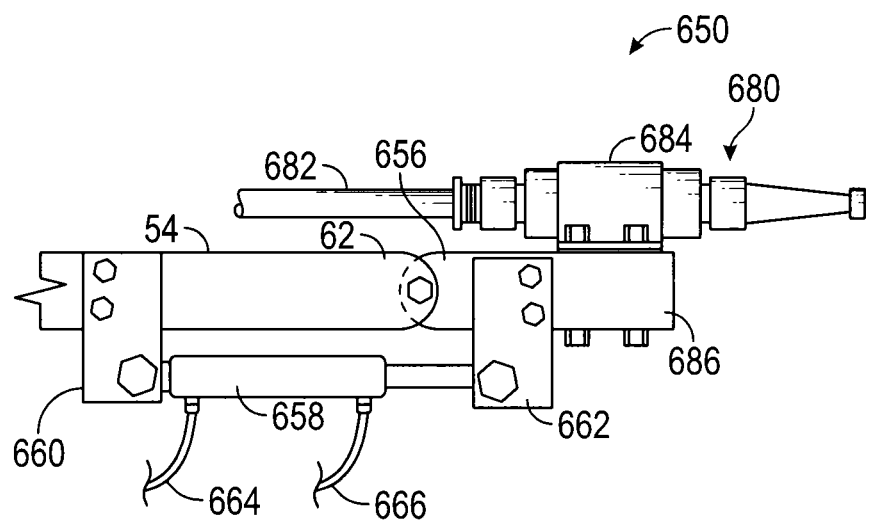
FIG. 17 shows a nozzle mounted on the end of the upper arm for elevated treatment of trees utilizing pesticides, herbicides, air, or compressed gas.

Referring now to FIG. 17, the positioning system 650 shown in FIG. 16 provides positioning of a nozzle assembly 680 connected to a supply hose 682. The supply hose 682 may provide air for thinning fruit, an appropriate chemical mixture for spraying trees and other plant life, or paint for use on difficult-to-reach locations. A collar 684 secures the nozzle assembly 680 to an adaptor 686.

Figure 18:
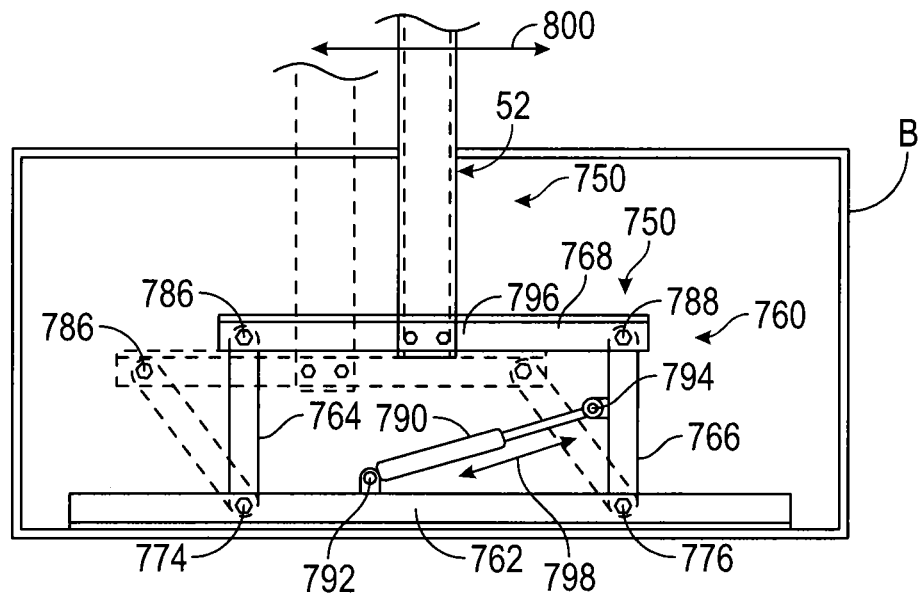
FIG. 18 shows another positioning system according to the present invention wherein a four-point linkage is attached to the bottom of a tractor's dirt bucket.
Figure 19:
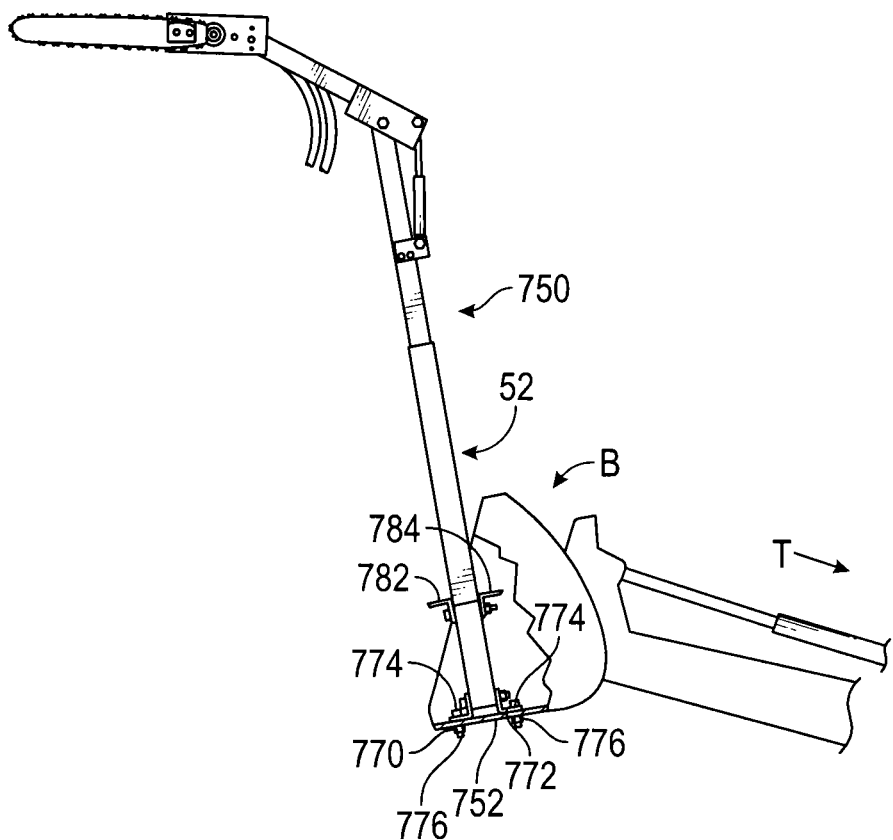
FIG. 19 is another view of the positioning system shown in FIG. 18 with the side of the dirt bucket cut away to show attachment of the telescoping mast to four-point linkage.

Referring now to FIGS. 18 and 19, another positioning system 750 is shown mounted in inner bottom 752 of a dirt bucket B. A four-point linkage assembly 760 is formed by a horizontal base 762, parallel vertical members 764, 766 of equal length, and a horizontal top 768. The horizontal base 762 consists of two parallel L-shaped members 770, 772 secured to the inner bottom 752 of the dirt bucket B by bolts 774 and nuts 776. One end of the vertical member 764 is pivotally attached to the horizontal base 762 by a left bottom pivot bolt 778, and one end of the parallel vertical member 766 is pivotally attached to the horizontal base 762 by a right bottom pivot bolt 780. The horizontal top 768 consists of two parallel L-shaped members 782, 784. The other end of the vertical member 764 is pivotally attached to the horizontal top 768 by a left top pivot bolt 786, and the other end of the vertical member 766 is attached to the horizontal top 768 by a right top pivot bolt 788. A hydraulic cylinder 790 is attached at one end to a mounting tab 792 attached to the horizontal base 762. The other end of the hydraulic cylinder 790 is attached to a mounting tab 794 located on the inside of the vertical member 766. The mast 52 is attached to a middle portion 796 of the horizontal top 768. Movement of the hydraulic cylinder 790 along 798 causes the mast 52 to move responsively along 800 while maintaining the mast 52 perpendicular to the horizontal top 768.

The present invention has been described as a positioning system because it is adaptable for use with a variety of ground-based vehicles to which the assembly 52 is attached. The mast 52, and thus applicant's positioning system generally, can be attached, by way of illustration and not by way of limitation, to an upstanding sidewall of a pickup bed, to a bale spike frame, to a skid loader, to a backhoe, or to an ATV. While attachment to a pickup bed may not permit use of hydraulic cylinders, an air compressor mounted in the pickup bed can be used to operate pneumatic cylinders (also referred to herein as pneumatic positioners).

It will also be understood by one skilled in the art that the present positioning system invention is well suited for placing a variety of tools in hard-to-reach locations such as trees.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein.

What is claimed is:

1. A positioning system attachable to a vehicle for remote operation of a chain saw by a user sitting in the vehicle, the positioning system comprising:
   a mast attachable to a vehicle;
   an upper arm having a proximal end rigidly connected to a pivot bracket, the pivot bracket pivotally connected to an upper portion of the mast and extending on either side of the mast, and a distal end of the upper arm attached to a chain saw, the upper arm and the mast forming an angle therebetween; and
   a shock absorber comprising a casing and a rod extendable therethrough, the shock absorber pivotally connectable to the pivot bracket at an upper portion of the shock absorber, and pivotally connectable to the mast at a lower portion of the shock absorber, the shock absorber when connected determining a minimum angle between the upper arm and the mast and positioned external to the minimum angle, the rod having an indicating portion that extends from the casing at the lower portion of the shock absorber when the angle between the upper arm and the mast is greater than the minimum angle, and wherein the indicating portion of the rod does not extend from the casing at the lower portion of the shock absorber when the angle between the upper arm and the mast is not greater than the minimum angle.

2. The positioning system of claim 1, wherein a lower portion of the mast is attachable to a loader attachment on a tractor.

3. The positioning system of claim 2, wherein the chain saw is powered by a hydraulic motor.

4. The positioning system of claim 3, further comprising hydraulic lines connecting the chain saw to hydraulics on the tractor.

5. The positioning system of claim 1, wherein the indicating portion of the rod has a color different from the shock absorber casing.

6. The positioning system of claim 1, wherein the shock absorber comprises a coil spring.

* * * * *